(12) United States Patent
DiGrado

(10) Patent No.: US 12,161,086 B2
(45) Date of Patent: Dec. 10, 2024

(54) PORTABLE TREAT DISPENSER WITH TRAINING CLICKER MECHANISM

(71) Applicant: Marco Christian DiGrado, Irvine, CA (US)

(72) Inventor: Marco Christian DiGrado, Irvine, CA (US)

( * ) Notice: Subject to any disclaimer, the term of this patent is extended or adjusted under 35 U.S.C. 154(b) by 244 days.

(21) Appl. No.: 17/969,455

(22) Filed: Oct. 19, 2022

(65) Prior Publication Data

US 2023/0123107 A1 Apr. 20, 2023

Related U.S. Application Data

(60) Provisional application No. 63/257,284, filed on Oct. 19, 2021.

(51) Int. Cl.
| | | |
|---|---|---|
| *A01K 15/02* | (2006.01) | |
| *A01K 5/00* | (2006.01) | |
| *A01K 5/01* | (2006.01) | |

(52) U.S. Cl.
CPC ............... *A01K 15/02* (2013.01); *A01K 5/00* (2013.01); *A01K 5/0114* (2013.01)

(58) Field of Classification Search
CPC ........ A01K 15/02; A01K 5/00; A01K 5/0114; A01K 15/025
See application file for complete search history.

(56) References Cited

U.S. PATENT DOCUMENTS

| | | | | |
|---|---|---|---|---|
| 5,405,047 A | * | 4/1995 | Hansen | B65D 83/0409 221/289 |
| 7,143,719 B1 | * | 12/2006 | Giddens | A01K 15/02 119/51.01 |
| 2005/0183674 A1 | * | 8/2005 | Zutis | A01K 15/025 119/719 |
| 2013/0233246 A1 | * | 9/2013 | Wang | A01K 15/025 119/51.01 |
| 2015/0096649 A1 | * | 4/2015 | Lathim | A01K 7/02 141/324 |
| 2023/0123107 A1 | * | 4/2023 | DiGrado | A01K 15/02 119/707 |

* cited by examiner

*Primary Examiner* — Bob Zadeh
(74) *Attorney, Agent, or Firm* — STETINA BRUNDA GARRED & BRUCKER

(57) ABSTRACT

There is provided a pet treat dispenser for dispensing pet treats. The dispenser includes a dispenser housing with a housing chamber and a treat dispenser opening. The dispenser includes a treat hopper having a treat storage cavity. The treat hopper is formed with the dispenser housing with the treat hopper body received in the housing chamber and with the treat hopper translating between closed and dispensing positions. In the closed position the treat storage cavity is not aligned with the treat dispenser opening. In the dispensing position the dispensing end is positioned adjacent to the treat dispenser opening exposing the treat storage cavity. The dispenser includes a clicking mechanism having a start position and a deflected position. The clicking mechanism deflects upon the treat hopper being translated to the dispensing position and to produce an audible sound upon the clicking mechanism being deflected.

9 Claims, 4 Drawing Sheets

PORTABLE TREAT DISPENSER WITH TRAINING CLICKER MECHANISM

CROSS-REFERENCE TO RELATED APPLICATIONS

The present application claims priority to U.S. Provisional Patent Application Ser. No. 63/257,284, filed on Oct. 19, 2021, entitled "Portable Treat Dispenser with Training Clicker Mechanism," the disclosure of which is incorporated herein by reference.

STATEMENT RE: FEDERALLY SPONSORED RESEARCH/DEVELOPMENT

Not Applicable

BACKGROUND

Modern pet training has evolved to use advanced training practices to efficiently teach pets new tricks and behaviors. One such modern invention is the training clicker. The purpose of a training clicker is to provide an instantaneous audible cue in the form of a click to positively reinforce good behavior. This form of positive reinforcement is generally considered more effective than human made sounds because the cue can be paired to a behavior the instant it is performed. Unlike a human vocal reaction which can take a second or two after the positive behavior to be spoken. The clicker has become a staple tool for pet trainers from novice to professional. The trick with the click is to pair the click with a pet treat so that the pet associates the clicking noise with a positive reinforcement such as a treat. Treats come in all shapes and sizes but all share the fact that they are small, morsels instead of large pieces so that the pet does not make the training session a meal. The ideal treat is one that appeals to the taste buds, not the stomach. The current training process requires the trainer to have two tools immediately at their disposal in order to engage in a clicker-based training session. The first is the clicker and the second is a vessel for the treats. The treat vessel is typically a fabric satchel, or in less sophisticated circumstances the trainer's pocket. This is an undesirable and untidy way of training which requires the user to always either have treats in their pocket or a satchel on their side. It is simply not ideal and creates too much inertia for the everyday pet trainer. Having inconvenient tools leads to a smaller likelihood of praising a pet when they do good behavior. Inconsistency in pet training is the number one factor that leads to poor results. A tool that brings convenience and portability to clicker training would solve these problems.

In view of the foregoing, there is a need in the art for an improved training clicking device.

BRIEF SUMMARY

According to an aspect of the invention, there is provided a pet treat dispenser for use in dispensing pet treats. The pet treat dispenser includes a dispenser housing having an outer surface and an inner surface. The inner surface defines a housing chamber within the dispenser housing. The dispenser housing further has a treat dispenser opening formed through the outer surface extending from the housing chamber. The pet treat dispenser further includes a treat hopper having a hopper body, a dispensing end, a button end, and a treat storage cavity formed in the hopper body. The treat hopper is cooperatively formed with the dispenser housing with the treat hopper body received in the housing chamber and with the treat hopper being able to be translated within the housing chamber between a closed position and a dispensing position. In the closed position the treat storage cavity is not aligned with the treat dispenser opening to block the treat storage cavity from being exposed to the treat dispenser opening. In the dispensing position the dispensing end is positioned adjacent to the treat dispenser opening exposing the treat storage cavity to the treat dispenser opening for allowing pet treats from within the treat storage cavity to be dispensed through the treat dispenser opening. The pet treat dispenser further includes a clicking mechanism having a start position and a deflected position. The clicking mechanism is sized and configured to deflect in elastic deformation from the start position to the deflected position upon the treat hopper being translated from the closed position to the dispensing position. The clicking mechanism is further sized and configured to produce an audible sound upon the clicking mechanism being deflected into the deflected position.

Advantageously, upon the treat hopper moving or translating from the closed position to the dispensing position an audible sound is produced by the clicking mechanism. In addition, upon the treat hopper being moved into the dispensing position, the treat storage cavity is exposed to the treat dispenser opening, thereby allowing pet treats stored in the treat storage cavity to be dispensed from the pet treat dispenser through the treat dispenser opening. The pet treat dispenser is a both a device for dispensing pet treats and for producing an audible sound or signal that may be used for pet training and pet rewards. In this regard, this is a 2-in-1 training tool. This has the efficiency of having a single input force for initiating both the dispensing of pet treats and producing the audible sound. From the pet training perspective, this single device instantaneously links the dispensed pet treat to the produced audible sound.

According to various embodiments, the clicking mechanism may be sized and configured to bias the treat hopper to move from the dispensing position to the closed position. The clicking mechanism may be a metal plate. The clicking mechanism may be connected to the dispenser housing. The hopper body may have an engagement portion that is sized and configured to engage and press against the clicking mechanism upon the treat hopper translating from the closed position to dispensing position. The treat hopper may have a scoop, and the treat storage cavity may extend to the scoop at the dispensing end. The dispenser housing has a main section and a cap, the housing chamber extends within both the main section and the cap and the treat dispenser opening is formed through the cap. The cap may be removably attachable to the main section. The treat dispenser opening may be a first treat dispenser opening, and the cap may have a second treat dispenser opening formed through the cap. The cap is sized and configured to be repositioned relative to the main section with the treat hopper in the dispensing position and the dispensing end is positioned adjacent to the second treat dispenser opening exposing the treat storage cavity to the second treat dispenser opening for allowing pet treats from within the treat storage cavity to be dispensed through the second treat dispenser opening. The button end may be sized and configured to receive an application of a manual force from a user to move the treat hopper from the closed position to the dispensing position.

The present invention will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

Figure 1:
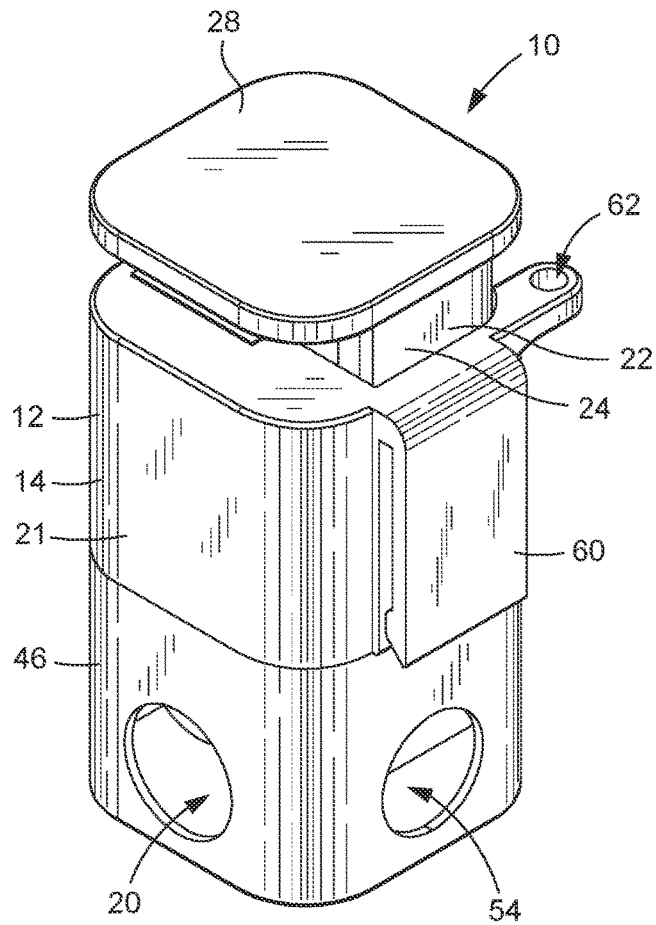
FIG. 1 is a perspective view of a pet treat dispenser according to an embodiment of the invention.
Figure 2:
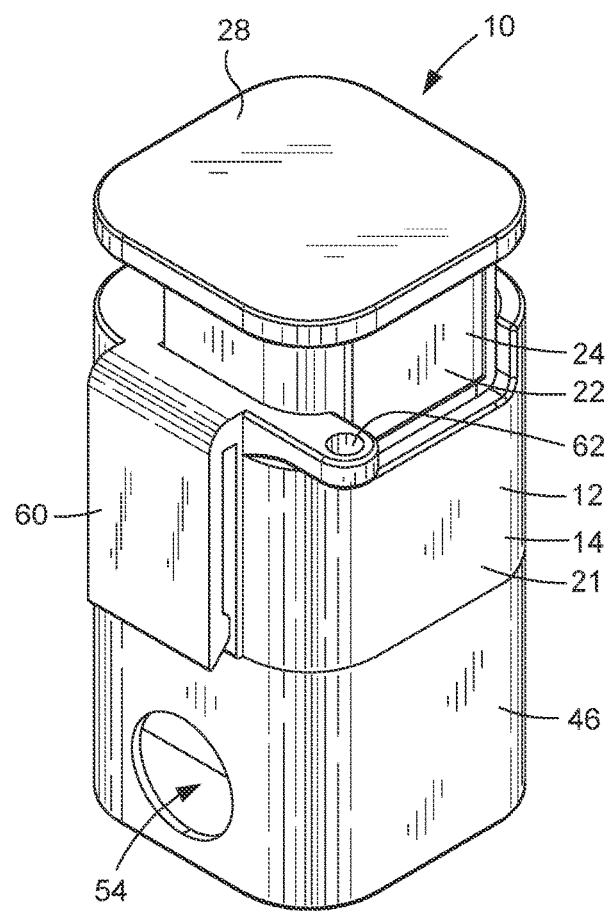
FIG. 2 is another perspective view of the pet treat dispenser of FIG. 1.
Figures 3, 4:
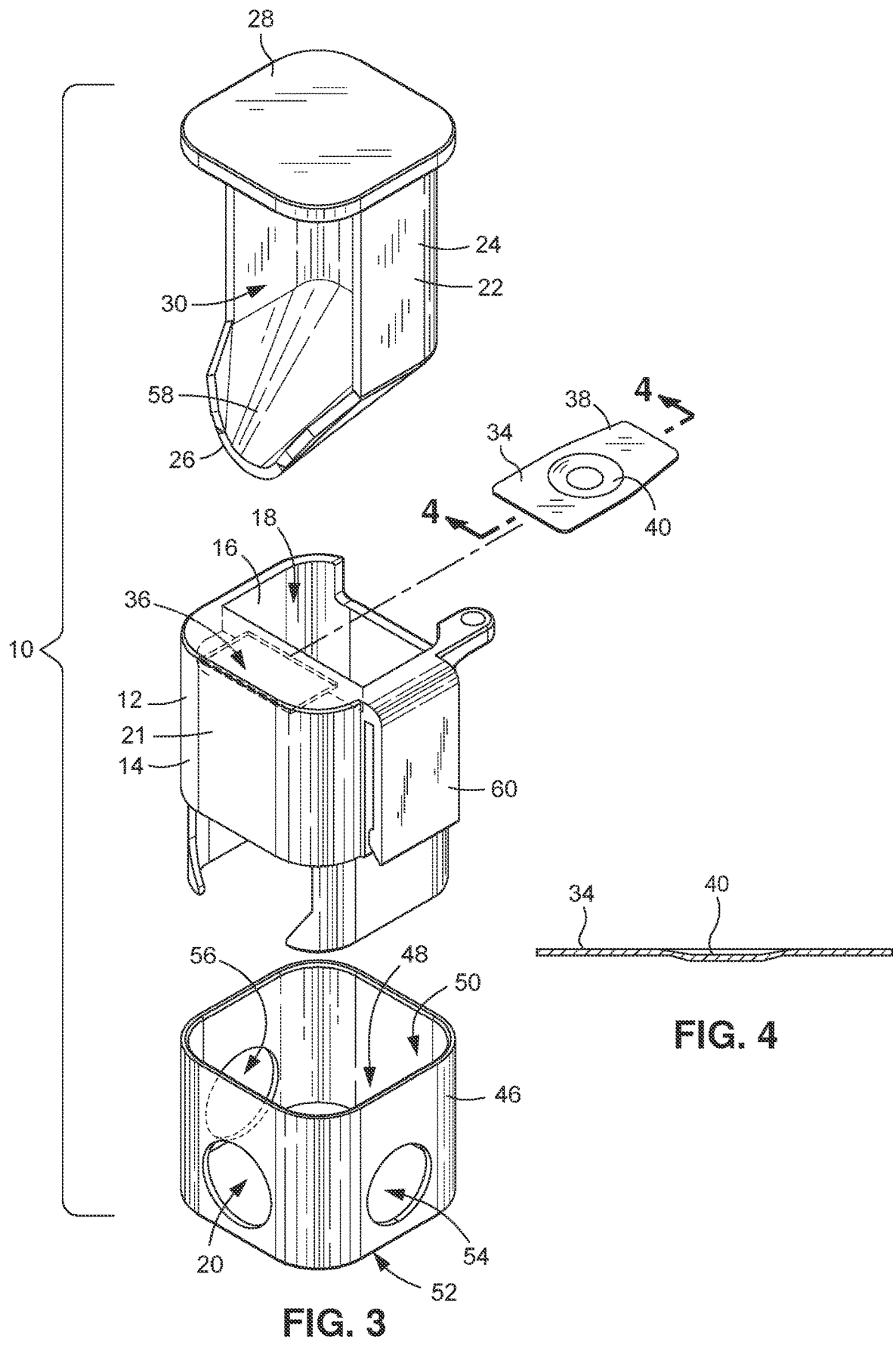
FIG. 3 is an exploded perspective view of the pet treat dispenser of FIG. 1.
FIG. 4 is a cross-sectional side view of a clicking mechanism of FIG. 3 as viewed along axis 4-4 of FIG. 3.
Figure 5:
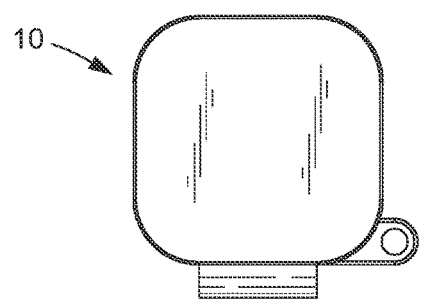
FIG. 5 is a top view of the pet treat dispenser of FIG. 1.
Figure 6:
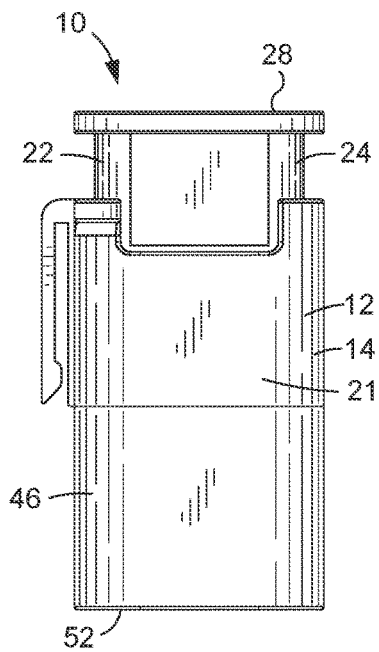
FIG. 6 is a back view of the pet treat dispenser of FIG. 1.
Figure 7:
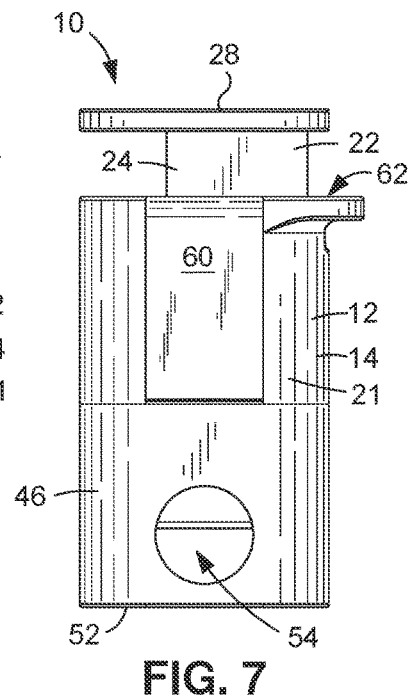
FIG. 7 is a side view of the pet treat dispenser of FIG. 1.
Figure 8:
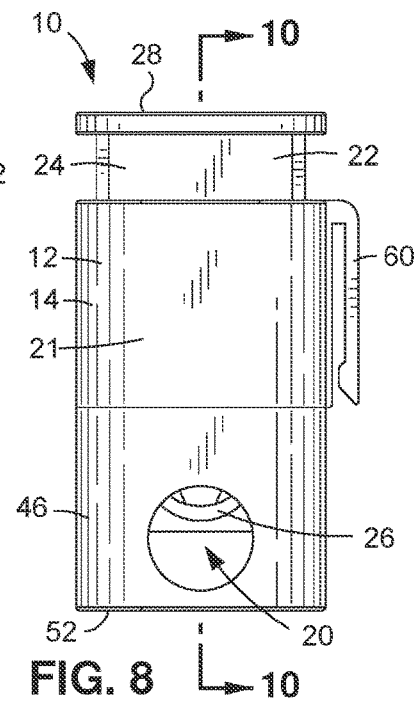
FIG. 8 is a front view of the pet treat dispenser of FIG. 1.
Figure 9:
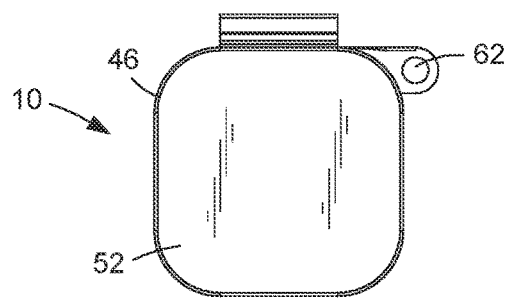
FIG. 9 is a bottom view of the pet treat dispenser of FIG. 1.
Figure 10:
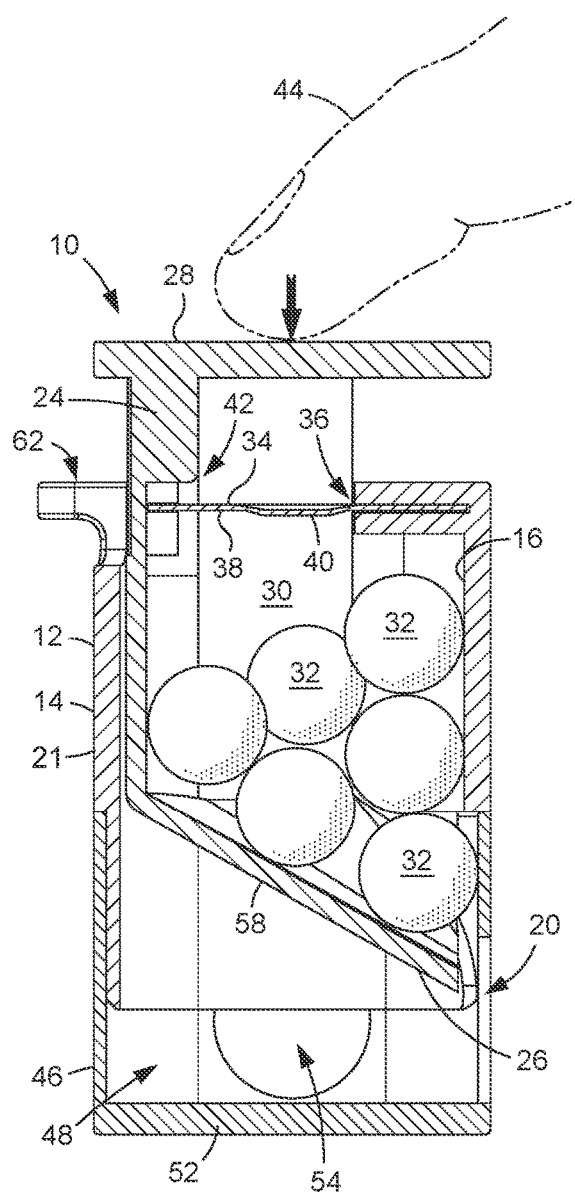
FIG. 10 is a cross-sectional side view of the pet treat dispenser as viewed along axis 10-10 of FIG. 8, with a treat hopper in a closed position as shown with pet treats (shown in dashed lining) and a user's finger (shown in dashed lining)
Figure 11:
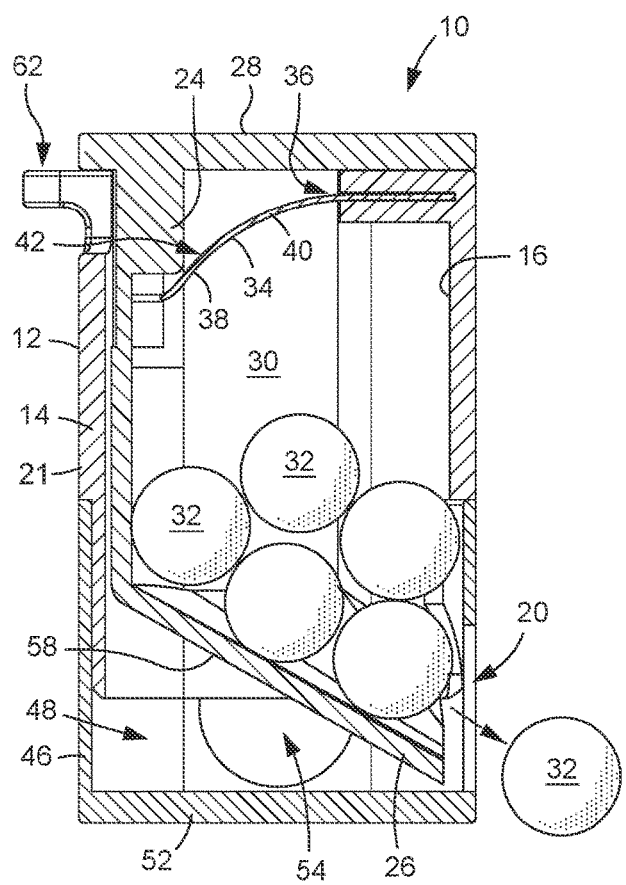
FIG. 11 is a cross-sectional side view of the pet treat dispenser of FIG. 10 with the treat hopper in a dispensing position and a pet treat as shown as being dispensed (shown in dashed lining).

Referring now to FIGS. 1-11, according to an aspect of the invention, there is provided a pet treat dispenser 10 for use in dispensing pet treats. The pet treat dispenser 10 includes a dispenser housing 12 having an outer surface 14 and an inner surface 16. The inner surface 16 defines a housing chamber 18 within the dispenser housing 12. The dispenser housing 12 further has a treat dispenser opening 20 formed through the outer surface 14 extending from the housing chamber 18 (as depicted in FIG. 3). The pet treat dispenser 10 further includes a treat hopper 22 having a hopper body 24, a dispensing end 26, a button end 28, and a treat storage cavity 30 formed in the hopper body 24. The treat hopper 24 is cooperatively formed with the dispenser housing 12 with the hopper body 24 received in the housing chamber 18 and with the treat hopper 22 being able to be translated within the housing chamber 18 between a closed position and a dispensing position. In the closed position the treat storage cavity 30 is not aligned with the treat dispenser opening 20 to block the treat storage cavity 30 from being exposed to the treat dispenser opening 20. In the dispensing position the dispensing end 26 is positioned adjacent to the treat dispenser opening 20 exposing the treat storage cavity 30 to the treat dispenser opening 20 for allowing pet treats 32 (as depicted in FIGS. 10 and 11 in dashed lining) from within the treat storage cavity 30 to be dispensed through the treat dispenser opening 20. The pet treat dispenser 10 further includes a clicking mechanism 34 having a start position and a deflected position. The clicking mechanism 34 is sized and configured to deflect in elastic deformation from the start position to the deflected position upon the treat hopper 22 being translated from the closed position to the dispensing position. The clicking mechanism 34 is further sized and configured to produce an audible sound upon the clicking mechanism 34 being deflected into the deflected position.

In an embodiment, the clicking mechanism 34 may be connected to the dispenser housing 12. The dispenser housing 12 may have a main section 21 with the housing chamber 18 extending within the main section 21. The dispenser housing 12 may include a retaining slot 36 formed in the main section 21 for engaging the clicking mechanism 34. The clicking mechanism 34 may take the form of a metal plate. For example, the clicking mechanism 34 may be formed of steel in a generally rectangular shape. The clicking mechanism 34 may have a strip body 38 and a depressed portion 40 formed in the strip body 38. One end of the strip body 38 may be inserted into the retaining slot 36. This may be press-fit and/or adhesively attached at the retaining slot 36. In this regard, the strip body 38 may be positioned to be generally cantilevered and extending orthogonal to the direction of translation of the treat hopper 22. The cross-sectional view of FIG. 10 depicts the treat hopper 22 in the closed position with the clicking mechanism 34 in the start position. In this embodiment, the strip body 38 is undeflected while in this start position. The cross-sectional view of FIG. 11 depicts the treat hopper 22 in the dispensing position with the clicking mechanism 34 in the deflected position.

The hopper body 24 may include an engagement portion 42. The engagement portion 42 may be configured to engage with the strip body 38 upon the treat hopper 22 translating from the closed position to the dispensing position. Such translation results in a force being applied from the engagement portion 42 to the strip body 38 at an end opposite of the end being constrained in the retaining slot 36. This results in the elastic deflection of the clicking mechanism 34. The strip body 38 is oriented with the depressed portion 40 facing a direction of translation of the treat hopper 22 from the closed position to the dispensing position (depressed in the direction downward in the view of FIG. 10).

In the configuration depicted in the drawings, upon the strip body 38 being deflected, the bottom side of the strip body 38 is in compression and the top side of the strip body 38 is in tension. Upon the strip body 38 being flexed a threshold degree of curvature the depressed portion 40 is configured to rapidly undergo elastic deformation. This rapid elastic deformation is contemplated to produce an audible sound. Some may describe this audible sound as a "click" or clicking sound. The depressed portion 40 may "pop" upward and result in the depressed portion 40 being relatively more coplanar with the rest of the strip body 38 while in this deflected position and the treat hopper 22 is translated to the dispensing position, such as depicted in FIG. 11. In addition, upon the release or movement of the treat hopper 22 from the dispensing position to the closed position and the clicking mechanism 34 is moved back from the deflected position to the start position the strip body 38 is flattened with decreasing tension at the top side of the strip body 38 and increasing tension at the bottom side of the strip body 38, resulting in another rapid elastic deformation. The depressed portion 40 may "pop" downward and result in the depressed portion 40 returning to its original depressed shape state (such as depicted in FIG. 10). As such, during the cycle of the treat hopper 22 moving from the closed position to the dispensing position and back to the closed position, two audible sounds or signals may be produced in succession.

The button end 28 may be sized and configured to receive an application of a manual force from a user (such as the user's finger 44 as symbolically depicted in FIG. 10 with the downward arrow representing the downward force) to move or translate the treat hopper 22 from the closed position to the dispensing position. As discussed above, upon the treat hopper 22 moving from the closed position to the dispensing position an audible sound is produced by the clicking mechanism 34. In addition, upon the treat hopper 22 being moved into the dispensing position, the treat storage cavity 30 is exposed to the treat dispenser opening 20, thereby allowing pet treats 32 stored in the treat storage cavity 30 to be dispensed from the pet treat dispenser 10 through the treat dispenser opening 20. In this regard, the pet treat dispenser 10 is a both a device for dispensing pet treats 32 and for producing an audible sound or signal that may be used for pet training and pet rewards. In this regard, this is a 2-in-1 training tool. This has the efficiency of having a single input force for initiating both the dispensing of pet treats 32 and producing the audible sound. From the pet training perspective, this single device instantaneously links the dispensed pet treat 32 to the produced audible sound.

The clicking mechanism 34 may be sized and configured to bias the treat hopper 22 to move from the dispensing position to the closed position. As mentioned above, the strip body 38 is deflected in elastic deformation. As such, the strip body 38 tends to resist being in the deflected position and tends move to attain the start position. Such tendency results in a bias or spring force from the strip body 38 against the engagement portion 42 to result in upward movement of the treat hopper 22 towards the closed position.

The dispenser housing 12 has the main section 21 and may have a cap 46. The housing chamber 18 may extend within both the main section 21 and the cap 46. The treat dispenser opening 20 may be formed through the cap 26. The treat hopper 22 is configured to translate within both the main section 21 and the cap 46. The cap 46 may have a cap cavity 48, a cap open top 50 and a cap bottom 52. The housing chamber 18 may be partially defined by the cap cavity 48. The cap 46 may be removably attachable to the main section 21. The cap open top 50 may be joined with the main section 21. For example, the cap 46 at the cap open top 50 may be press fit within the main section 21. The cap 46 may be readily removed so as to facilitate an ease of filling the treat storage cavity 30 with pet treats 32. Once the treat storage cavity 30 is filled to a desired level or amount, the cap 46 may be engaged with the main section 21, thereby making ready for use the pet treat dispenser 10.

The treat dispenser opening 20 may be a first treat dispenser opening, and the cap 46 may have a second treat dispenser opening 54 and a third treat dispenser opening 56 formed through the cap 46. The cap 46 is generally cube shaped and the treat dispenser opening 20, the second treat dispenser opening 54 and the third treat dispenser opening 56 may each be formed through different lateral faces of such cube shape. The treat dispenser opening 20, the second treat dispenser opening 54 and the third treat dispenser opening 56 may have differing sizes. The cap 46 is sized and configured to be repositioned relative to the main section 21 with the treat hopper 12 in the dispensing position and the dispensing end 26 is positioned adjacent to a desired one of the treat dispenser opening 20, the second treat dispenser opening 54 and the third treat dispenser opening 56. For example, the cap 46 may be repositioned and attached to the main section 21 such that the treat storage cavity 30 is exposed to the second treat dispenser opening 54 for allowing pet treats 32 from within the treat storage cavity 30 to be dispensed through the second treat dispenser opening 54. The selection of the treat dispenser opening 20, the second treat dispenser opening 54 or the third treat dispenser opening 56 may depend upon the desired size and/or amount of pet treats 32.

The treat hopper may have a scoop 58, and the treat storage cavity 30 may extend to the scoop 58 at the dispensing end 26. The scoop 58 may have an angled profile in comparison to the direction of movement of the treat hopper 22. Such angled profile may be advantageous to help direct the movement of pet treats 32 from the treat storage cavity 30 to and through the treat dispenser opening 20. In addition, with the cap 46 removed, the scoop 58 may be useful with refilling the treat storage cavity 30 with pet treats 32.

The pet treat dispenser 10 may include a clip 60 and a keychain hole 62 formed in the dispenser housing 12. The clip 60 may be used to attach the pet treat dispenser to any number of items and locations for storage and ease of accessibility, is as attachment at a pants/shorts waistband, belts or pocket for examples. Similarly, the keychain hole 62 may be used for attachment of a keyring or carabiner.

It is contemplated that the clicking mechanism 34 may take various forms and configurations. While the clicking mechanism 34 described above is in the form of a single metal strip, the clicking mechanism 34 may have various components, be formed of various materials and be chosen from those which are well known to one of ordinary skill in the art. In this regard, the term clicking mechanism 34 refers to those elements which effect an audible sound or signal in response to the translation or movement of the treat hopper from the closed position to the dispensing position. In addition, it is contemplated that the dispenser housing 12, the treat hopper 22 and the cap 46 may be formed of any of those materials and according to those manufacturing techniques which are well known to one of ordinary skill in the art, such as a molded plastic material. Further, the various other sizing, relative sizing and geometry of these components may be different than as depicted. For example, the dispenser housing 12 and the cap 46 of the depicted embodiment have a generally square cross-section. However, in another embodiment, the cross sections may be circular. Such a configuration may make the repositioning of the cap 46 relative to the dispenser housing 12 relatively easy for selection of the treat dispenser opening 20, the second treat dispense opening 54 or the third dispenser opening 56 as may be desired by simply rotating the cap 46.

The particulars shown herein are by way of example only for purposes of illustrative discussion, and are presented in the cause of providing what is believed to be the most useful and readily understood description of the principles and conceptual aspects of the various embodiments set forth in the present disclosure. In this regard, no attempt is made to show any more detail than is necessary for a fundamental understanding of the different features of the various embodiments, the description taken with the drawings making apparent to those skilled in the art how these may be implemented in practice.

What is claimed is:
1. A pet treat dispenser for use in dispensing pet treats, the dispenser comprising:
   a dispenser housing having an outer surface and an inner surface, the inner surface defining a housing chamber within the dispenser housing, the dispenser housing further having a treat dispenser opening formed through the outer surface extending from the housing chamber;

a treat hopper having a hopper body, a dispensing end, a button end, and a treat storage cavity formed in the hopper body, the treat hopper being cooperatively formed with the dispenser housing with the hopper body received in the housing chamber and with the treat hopper being able to be translated within the housing chamber between a closed position and a dispensing position, in the closed position the treat storage cavity is not aligned with the treat dispenser opening to block the treat storage cavity from being exposed to the treat dispenser opening, in the dispensing position the dispensing end is positioned adjacent to the treat dispenser opening exposing the treat storage cavity to the treat dispenser opening for allowing pet treats from within the treat storage cavity to be dispensed through the treat dispenser opening; and a clicking mechanism having a start position and a deflected position, the clicking mechanism being sized and configured to deflect in elastic deformation from the start position to the deflected position upon the treat hopper being translated from the closed position to the dispensing position, the clicking mechanism further being sized and configured to produce an audible sound upon the clicking mechanism being deflected into the deflected position and the clicking mechanism is sized and configured to bias the treat hopper to move from the dispensing position to the closed position.

2. The pet treat dispenser of claim 1 wherein the clicking mechanism is a metal plate.

3. The pet treat dispenser of claim 1 wherein the clicking mechanism is connected to the dispenser housing.

4. The pet treat dispenser of claim 3 wherein the hopper body has an engagement portion, the engagement portion is sized and configured to engage and press against the clicking mechanism upon the treat hopper translating from the closed position to dispensing position.

5. The pet treat dispenser of claim 1 wherein the treat hopper has a scoop, the treat storage cavity extends to the scoop at the dispensing end.

6. The pet treat dispenser of claim 1 wherein the dispenser housing has a main section and a cap, the housing chamber extends within both the main section and the cap and the treat dispenser opening is formed through the cap.

7. The pet treat dispenser of claim 6 wherein the cap is removably attachable to the main section.

8. The pet treat dispenser of claim 6 wherein the treat dispenser opening is a first treat dispenser opening, the cap has a second treat dispenser opening formed through the cap, the cap is sized and configured to be repositioned relative to the main section with the treat hopper in the dispensing position and the dispensing end is positioned adjacent to the second treat dispenser opening exposing the treat storage cavity to the second treat dispenser opening for allowing pet treats from within the treat storage cavity to be dispensed through the second treat dispenser opening.

9. The pet treat dispenser of claim 1 wherein the button end is sized and configured to receive an application of a manual force from a user to move the treat hopper from the closed position to the dispensing position.

\* \* \* \* \*